Dec. 2, 1941.     E. BLEIBLER     2,264,357
MACHINE FOR THE MANUFACTURE OF HYDRATED CELLULOSE
Filed Feb. 17, 1938     2 Sheets-Sheet 1

INVENTOR
Ernest Bleibler
BY
Heinrich Hochschild
ATTORNEY

Dec. 2, 1941.   E. BLEIBLER   2,264,357
MACHINE FOR THE MANUFACTURE OF HYDRATED CELLULOSE
Filed Feb. 17, 1938   2 Sheets-Sheet 2

INVENTOR
ERNEST BLEIBLER
BY
ATTORNEY

Patented Dec. 2, 1941

2,264,357

UNITED STATES PATENT OFFICE 2,264,357

MACHINE FOR THE MANUFACTURE OF HYDRATED CELLULOSE

Ernest Bleibler, Ghent, Belgium

Application February 17, 1938, Serial No. 191,026
In Belgium February 19, 1937

7 Claims. (Cl. 18—15)

In the manufacture of paper, the production per machine unit has been very considerably increased during the last decades. This increase is due on the one hand to a higher speed and on the other to a larger width of the band. There are machines wherein the manufacturing width attains 5 or 6 meters.

In the continuous manufacture of cellulosic film and especially viscose film, the width of the band has always been and still is relatively small. Up to 1927, that is to say for about 20 years, the maximum width of manufacture was 90 to 100 centimeters. From 1927, this width definitely exceeded 1 meter and from 1930 it had become about 130 centimeters. This width has since been adopted by the large manufacturers.

Considering the enormous development in the production of this article, this situation appears strange. The principal reason is the following:

Due to a mostly inevitable shrinkage which the cellulose band undergoes on coagulation and during the entire manufacture, but principally during certain operations, the sheet of cellulose to be coagulated has to be much wider than (almost double) the finished band of film.

During transport from coagulation to the winding of the finished film, the band must be accessible to the workmen at each place and at each moment, on account of its fragility.

The present invention relates to an improved large width film machine which will be described hereinafter with reference to the accompanying drawings, wherein.

Figure 1:
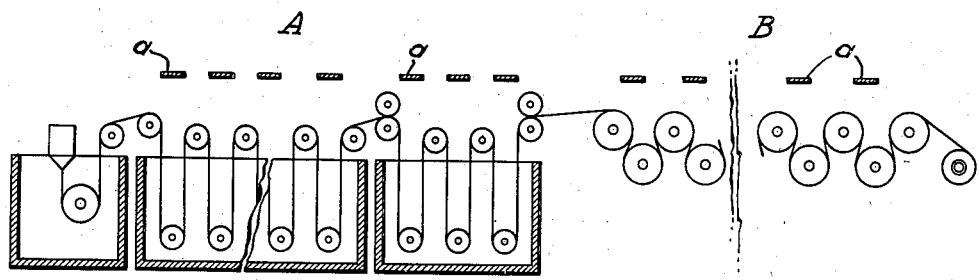
Figure 1 represents diagrammatically a longitudinal section of a film machine.
Figure 2:
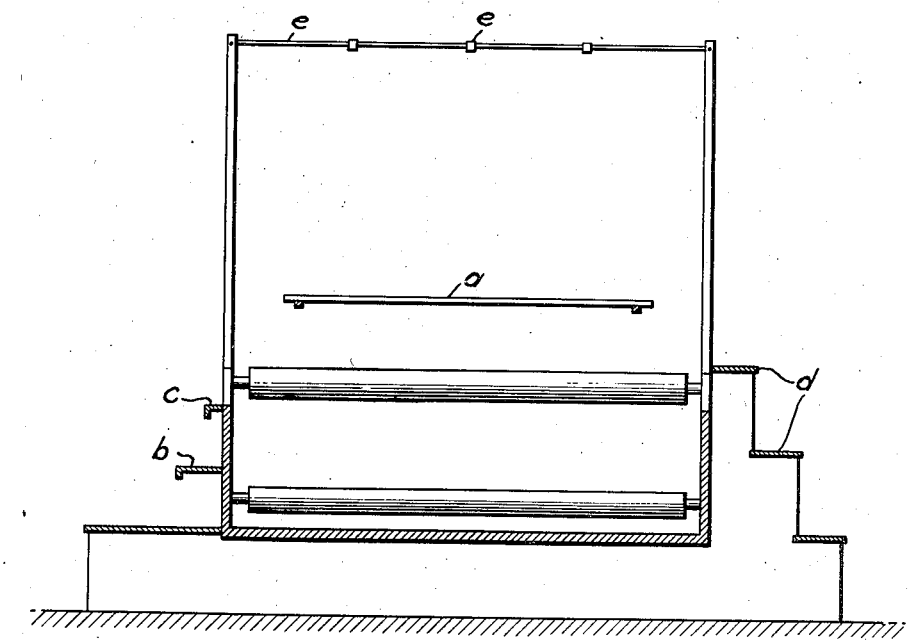
Figures 2 and 3 are cross-sections.
Figure 3:
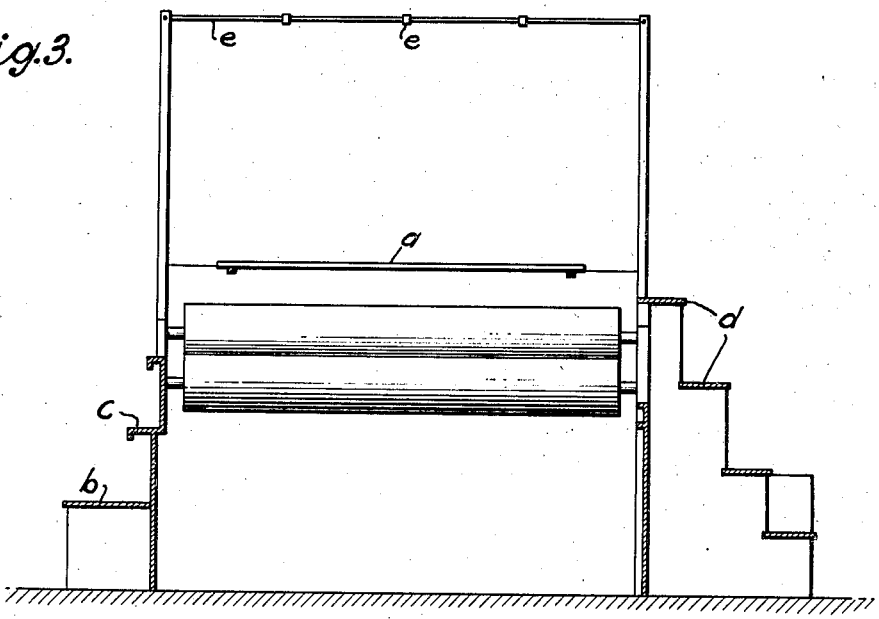
Figure 4:
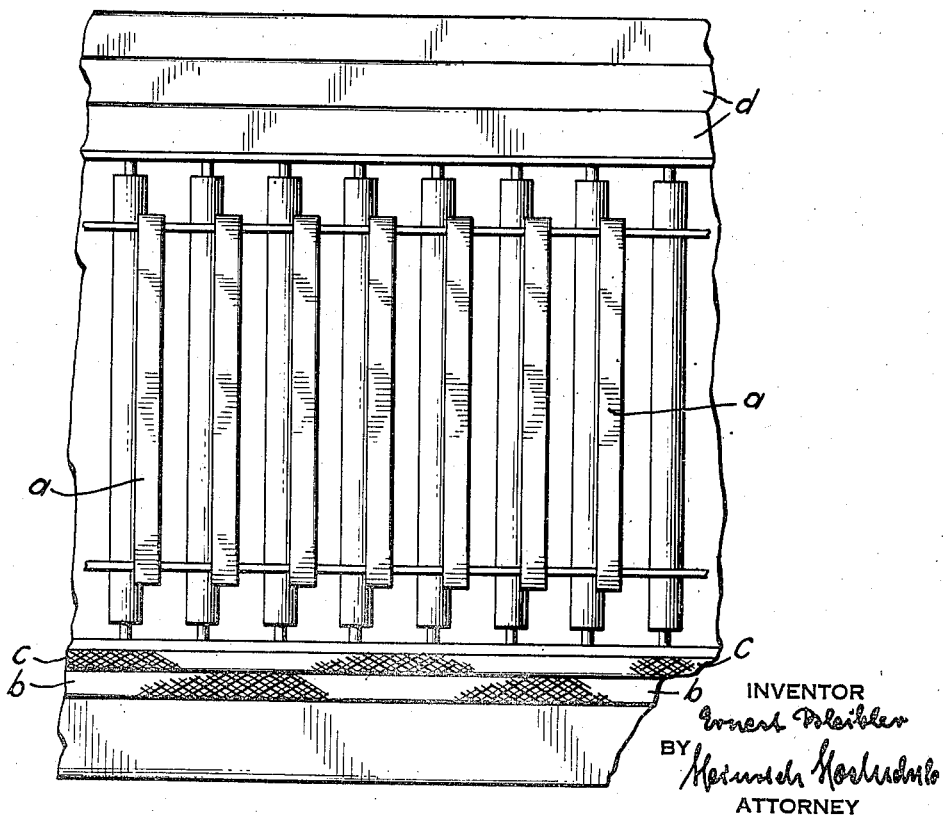
Figure 4 is a plan view.

As is generally known (see Figure 1) the band is transported by a system of rollers, spaced apart in the wet part A and very close together in the drier B.

In order to render the film accessible at each place from the edge of the machine, the length of the rollers, that is to say the width of the band, is limited.

In order that a workman situated at the side of the machine can, by leaning over it, reach or go beyond with his hand or a knife the centre of the rollers, the width of the finished band may be about 1 meter.

By means of a device whereby the workman can take up a position in the centre of the machine, the inventor of the present invention provided some years ago the possibility of increasing the width of the manufactured band to the final width of about 1.30 meters. This device comprised a support normally formed by a round bar disposed substantially in the centre of the machine and sufficiently above the band to permit ready accessibility from all points. In place of a round bar as support, two bars close together or a rectangular strip are sometimes employed. This device has been adopted by the majority of constructors.

The present invention now consists of a device whereby it is possible to produce films of considerable width and in particular films wider than 150 centimeters.

With such a width, a support at the centre of the machine would no longer be accessible for the workmen situated on the service footbridge. It would no longer be sufficient to lean over from the edge of the machine on said support in order to be able to reach any point on the film.

In order to permit complete accessibility of a band of considerable width, a footbridge is provided above the machine. This footbridge would follow the band above the machine from one end to the other, so as to permit the attendants to have access to each point on the width and length of the band, especially where it passes over the upper rollers.

As a constructional example of this footbridge, a system of parallel strips may be mentioned, said strips being placed above the rollers over the entire length of the machine and being spaced apart sufficiently to permit the workmen, without being inconvenienced, to have access to any point on the band.

Service is carried out principally across the machine. If, for example, in the event of breakage of the film, the latter winds itself on one of the rollers, it is necessary that the workman should have access to the roller without being impeded or to the least possible extent, in the direction of the length, that is to say across the machine.

For this reason it is advantageous to form the footbridge in such a manner that there exist, principally above the rollers, free passages across the machine. The footbridge may, therefore, if necessary, be made of strips or plates placed across the machine and spaced apart sufficiently to permit the free passage of the workman's arms downwardly, that is to say towards the rollers (see in Figures 1, 2, 3 and 4, the plates a).

The footbridge should be wide enough to be readily accessible from the edge of the machine and particularly from the service side of the latter. To facilitate this accessibility, one or more steps are provided along the machine between the service gangway and the level of the upper rollers. Provision is made to employ for this purpose the frames carrying the rollers by adding or fixing thereto for example a step b halfway up, and by forming the upper part so as to provide a second step c.

Provision is likewise made to dispose on the driving side of the rollers protections forming gangways and steps d in the direction of the length, permitting ready access to the footbridge above the machine.

It is also proposed to fix cross-members in the form of bars, cords or cables e, above the machine so that the attendants on the footbridge can hold themselves thereby.

I claim:

1. In a large width film machine for hydrated cellulose the combination with the rollers of the machine of a supporting system above the upper rollers and within arm's reach from said upper rollers, the said supporting system being formed by footbridges constituted by parallel strips situated above the rollers and spaced apart sufficiently to permit the workman to have access at any point of the band.

2. In a large width film machine for hydrated cellulose, the combination with the rollers of the machine of a supporting system above the upper rollers and within arm's reach from said upper rollers, so as to allow a workman to have access to the film where it passes over the upper rollers, a step being provided at the service side of the machine.

3. In a large width film machine for hydrated cellulose the combination with the rollers of the machine of a supporting system above the upper rollers and within arm's reach from said upper rollers so as to allow a workman to have access to the film where it passes over the upper rollers, a system of steps at the drive side of said machine, the driving members of the rollers covered by said steps throughout the length of the machine, said system of steps permitting ready access to said supporting system.

4. In a large width film machine for hydrated cellulose the combination with the rollers of the machine of a supporting system above the upper rollers and within arm's reach from said upper rollers, so as to allow a workman to have access to the film where it passes over the upper rollers, said supporting system provided with holding means adapted to be gripped by the workmen on the supporting system.

5. A large width film machine for hydrated cellulose, including a film supporting and conveying upper and lower roller tier and a service bridge extending substantially along and above said upper roller tier and within arm's reach from said upper roller tier.

6. A machine for manufacturing hydrated cellulose films of a width of more than 150 cms., including a film supporting and conveying upper and lower roller tier and a service bridge above and along said upper roller tier and within arm's reach from said upper roller tier, said service bridge adapted to allow a workman access to any point of the surface of said film on said upper roller tier.

7. A machine for manufacturing hydrated cellulose films of large widths which includes a film supporting and conveying upper and lower roller tier and a service bridge along and above said upper roller tier and at a distance within arm's reach from said upper roller tier, said service bridge constructed with spaces between constructional elements, for the purpose of rendering accessible from said bridge and through said spaces the surface of said film on said upper roller tier.

ERNEST BLEIBLER.